Aug. 17, 1926.
T. C. STEIMER
1,596,124
GLASS FEEDING MECHANISM
Original Filed Feb. 12, 1910    4 Sheets-Sheet 1
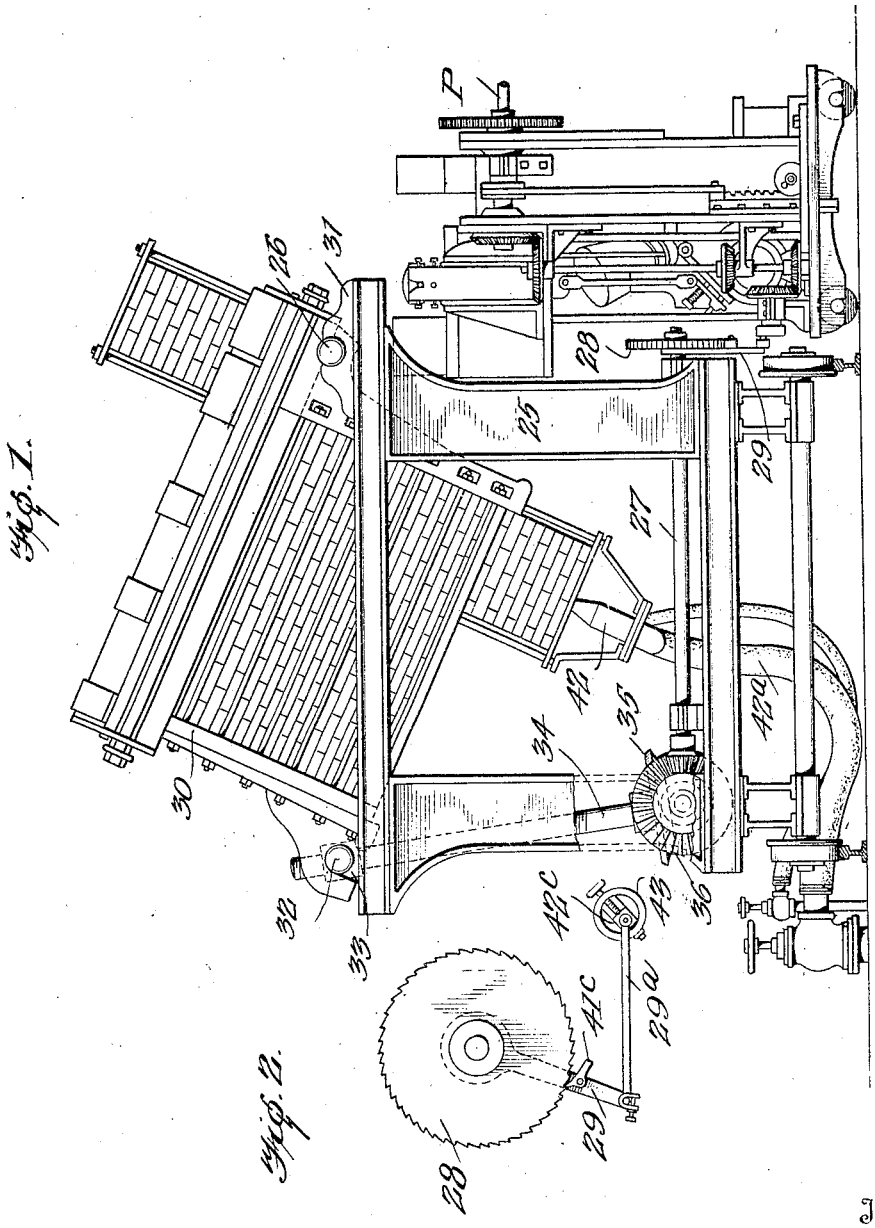
Inventor
CHARLES M. STEIMER,
EXECUTOR OF THEODORE C. STEIMER,
By
Attorney Aug. 17, 1926.

T. C. STEIMER 1,596,124

GLASS FEEDING MECHANISM

Original Filed Feb. 12, 1910 4 Sheets-Sheet 2

Inventor
CHARLES M. STEIMER,
EXECUTOR OF THEODORE C. STEIMER,

By Dorsey Cole

Attorney

Aug. 17, 1926.　　　　　　　　　　　　　　　1,596,124
T. C. STEIMER
GLASS FEEDING MECHANISM
Original Filed Feb. 12, 1910　　4 Sheets-Sheet 4

Inventor
CHARLES M. STEIMER,
EXECUTOR OF THEODORE C. STEIMER,

By Joseph Cole
Attorney

Patented Aug. 17, 1926.

1,596,124

UNITED STATES PATENT OFFICE.

THEODORE C. STEIMER, DECEASED, LATE OF PITTSBURGH, PENNSYLVANIA; BY CHARLES M. STEIMER, EXECUTOR, OF ZANESVILLE, OHIO, ASSIGNOR, BY MESNE ASSIGNMENTS, TO THE HARTFORD SPECIAL MACHINERY COMPANY, A CORPORATION OF CONNECTICUT.

GLASS-FEEDING MECHANISM.

Original application filed February 12, 1910, Serial No. 543,582. Divided and this application filed October 27, 1925. Serial No. 65,188.

The invention herein claimed relates to the art of feeding glass for the manufacture of pressed or blown articles, such as tableware and the like.

This application is directed to furnaces for melting glass so constructed that the melting chamber can be placed in cooperative relation with a suitable glass feeding mechanism and when so located can deliver to the glass-feeding mechanism glass at a uniform rate equal to the rate at which the feeding mechanism itself is delivering the glass to the forming machine.

Referring to the accompanying drawings, in which corresponding parts are designated by similar marks of reference, and which are reproductive in part of those filed in the original application aforesaid, and which show, in addition to the features herein claimed, certain matters to be claimed in the aforesaid original application.

Figure 1 is a side elevation of a structure embodying the invention herein claimed as the invention of THEODORE C. STEIMER, showing also parts of a feeder and of a pressing machine.

Figure 2 is a detail of mechanism for operating the tilting of the furnace.

Figure 3:
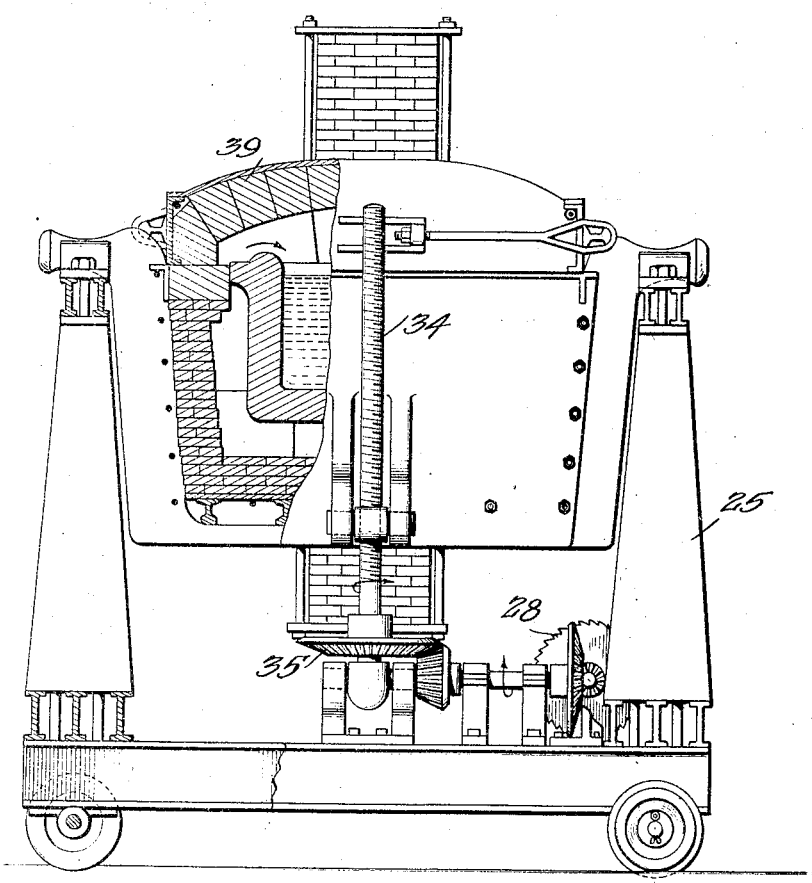
Figure 3 is a rear elevation and partial section of the furnace.

A frame 25 carries a melting and delivery furnace 30 which is pivoted at 31 and pours out the glass constantly at a fixed head by reason of its construction and through the agency of the screw 34. The glass flows in an unbroken stream into an interrupter chamber 45 of a suitable feeder, by which it is divided up into charges which drop into the funnel 63 to be fed to molds, one of which is shown at M on the table 91 of a pressing machine by which the charge of glass is pressed.

In order that the manufacturing process may be continuous day and night, I propose using several of the furnaces. The entire apparatus, including the actuation of the plunger 58 of the feeder, (which determines the rate of glass delivery to the forming machine) and the operation of the pressing machine, is operated from a single power shaft P, but nevertheless the furnace is portably mounted and may be removed and replaced by another.

On a frame 25 of any suitable construction, I provide a stationary bearing 26 and a movable bearing 32 to carry the furnace. All the operations necessary to move the furnace are provided for by a shaft 27 driven by a gear 28 and ratchet arm 29 shown in detail in Figure 2 and hereafter described. It is sufficient at this point to say, that the furnace may be entirely removed by merely disconnecting the air and gas pipes in the usual way, and lifting the driving link 29ª off of its connecting pin on the arm 29. The furnace 30 may be of the usual construction of iron framing and the outside casing is as customary; but the entire frame and casing are supported on the fixed trunnions 31 at the front of the furnace, and bearing 32 at the rear of the furnace engaging a movable trunnioned nut 33 riding on a pivoted screw 34, which has a bearing in the frame 25 and is rotated slowly and intermittently by gearing 35 and 36 from the shaft 27.

The interior construction of the furnace is peculiar; the melting pot 37 as seen in Figure 6 is of wedge shape, with vertical sides, so that as the furnace is tipped about its pivoting point, which corresponds with the line of the pouring mouth 38, the glass is always poured from the same level and from exactly the same position in the furnace. That is, the pouring point is immovable and the whole body of the glass moves around it as a center. By this means I am enabled to drain off the entire charge of glass, leaving no residue to mix with a new charge, which would be very detrimental. The raw material for the glass may be introduced by lifting off the top 39. It will be observed that the pot 37 is in a reverberatory chamber formed by the passages 40 and 41, being heated in any convenient way, as by the air and gas burner 42 fed by any convenient form of piping 42ª.

Figure 4:
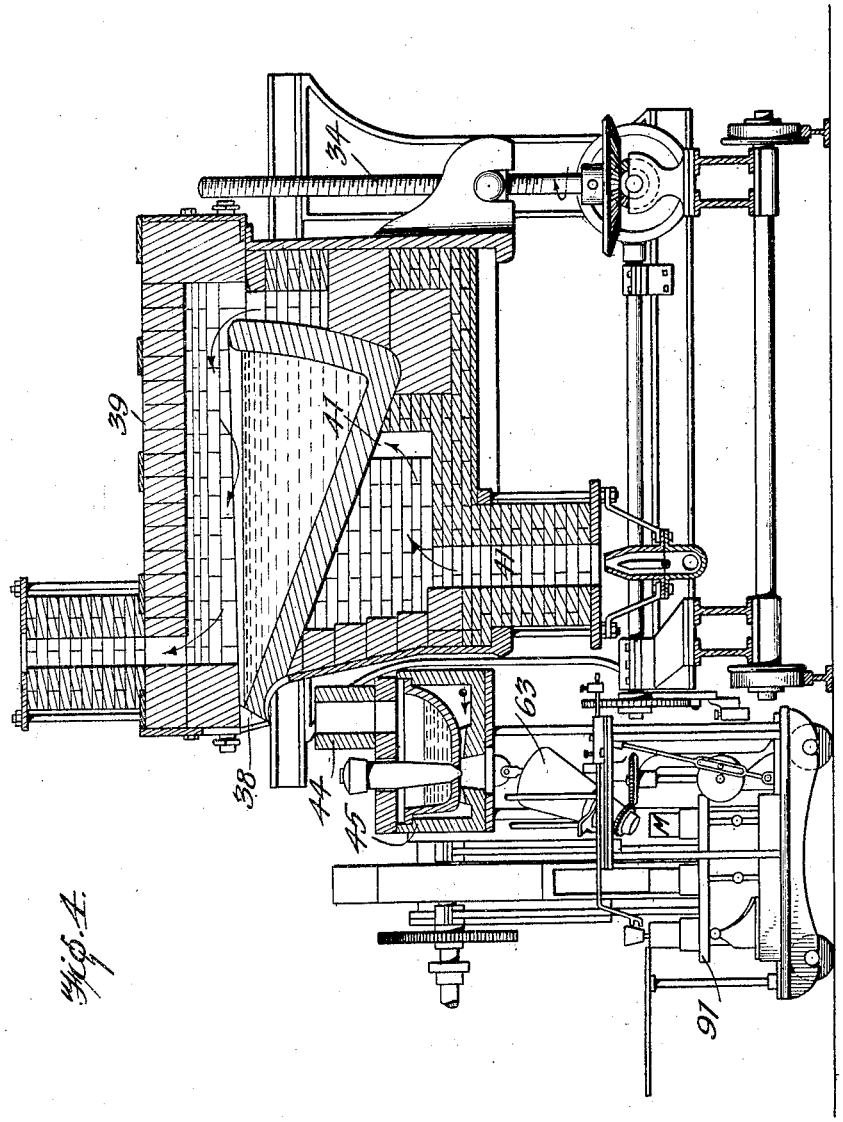
Figure 4 is a central vertical section of the mechanism of Figure 1 showing a full charge of molten glass in the furnace.
Figure 5:
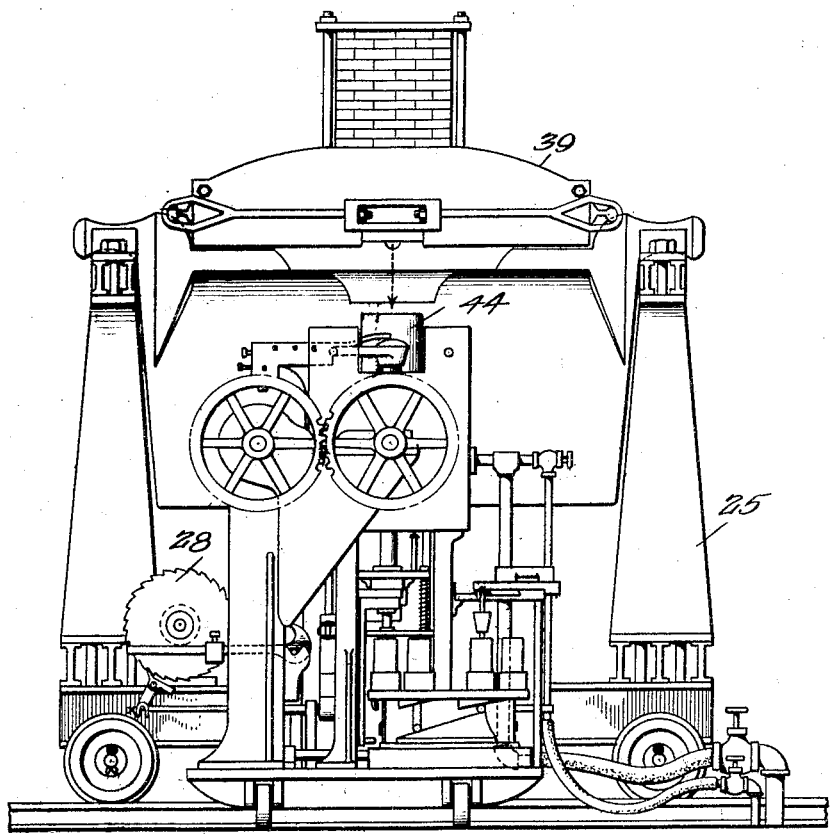
Figure 5 is an end elevation of mechanism shown in Figure 1.

The pouring of the glass from the furnace 30, accompanied by the slow revolution of shaft 27 and screw 34, is brought about by the reciprocating movement of arm 29, which as will be seen in Figures 1, 2 and 4, is provided with a dog or ratchet 41ᶜ, moved intermittently, and moved any desired distance to regulate the flow of glass, by means of link 29ᵃ engaging an adjustable wrist pin 42ᶜ set in a revolving wheel 43, geared up, as will be obvious from Fig. 3, with the main power shaft P. That is, by attachment to a continually rotating element, the dog and circular rack just described will slowly and continuously tip the furnace about its pouring spout as an axis, so as to deliver a continuous stream of glass at the exact rate required. The adjustment is made without stopping the machine. The glass is always under the same conditions of temperature, pressure head, movement, etc., and the entire charge of the furnace is used up.

The stream of glass protected by the hood 44 flows into the interrupter chamber 45 from which it may be delivered in any desired manner to the molds.

Briefly, the operation of the apparatus is as follows:—

The glass having been properly mixed and melted in the combined melting and pouring pot 37, it will be understood that the glass flows in a continuous or unbroken stream through the spout 38 into the interrupter chamber. Although the screw 34 tilting the furnace has an intermittent step by step movement, this is very slow, and the changes of positions are so small that they do not interrupt the continuity of the out-pouring stream.

As stated, all of the motions of the machine are accomplished from the single power shaft P, and without any hand manipulation. The process may thus be continued without cessation, since the furnace 30 may be removed and replaced. Among the advantages of my invention are the complete emptying of the melting tank, and the uniform pouring therefrom of glass under absolutely constant conditions.

As stated, this application is filed as a division, its purpose being to cover the construction of a melting furnace above specified. While to properly explain its operation, certain other features have been illustrated or referred to, such other features form no part of the invention to be here claimed, they forming the subject-matter of the claims in the said original application, or of other applications filed as divisions thereof.

Having thus described the subject-matter of this application what is herein claimed as the invention of THEODORE C. STEIMER (deceased) is:—

1. In an apparatus for delivering glass, the combination with a melting furnace pivoted to move on a horizontal axis, a heated chamber adjacent to the furnace and having a delivery orifice, and coordinated means to permit the intermittent flow of glass from the orifice and to tilt the furnace to deliver glass to the heated chamber at a rate equal to the rate of escape from the orifice to maintain a constant glass level in the chamber.

2. The combination with means for delivering glass charges comprising a container for containing heated glass and means for controlling the feed of glass therefrom, of supporting frames movable in respect to the container, a furnace for melting glass mounted in each frame, means for delivering glass from each furnace when in cooperative relation with the container, and removable connections between a furnace and a source of fuel supply.

3. The combination with means for delivering glass charges comprising a container for heated glass and means for controlling the feed of glass therefrom, of supporting frames in movable relation to the container and provided with bearings, a furnace for melting glass contained in the bearings of each frame, means for tilting a furnace when in the bearings to deliver the glass from the furnaces to the container, and removable connections between a furnace and a source of fuel supply.

4. The combination with means for delivering glass charges, comprising a feeder, of a series of movable glass melting furnaces adapted to be brought into cooperative relation with the glass feeder, detachable fuel connections for the furnaces when in such cooperative relation, and means for tilting the furnaces.

CHARLES M. STEIMER,
*Executor of Theodore C. Steimer, Deceased.*